(12) United States Patent
Hurley et al.

(10) Patent No.: US 7,843,827 B2
(45) Date of Patent: Nov. 30, 2010

(54) METHOD AND DEVICE FOR CONFIGURING A NETWORK DEVICE

(75) Inventors: Paul T. Hurley, Zurich (CH); Andreas Kind, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 11/641,431

(22) Filed: Dec. 19, 2006

(65) Prior Publication Data

US 2007/0147246 A1    Jun. 28, 2007

(30) Foreign Application Priority Data

Dec. 23, 2005    (EP)    ................... 05112959

(51) Int. Cl.
   *H04L 12/26* (2006.01)
(52) U.S. Cl. ..................................... 370/232
(58) Field of Classification Search ................ 370/232, 370/233, 234, 254; 709/220, 221, 224
   See application file for complete search history.

(56) References Cited

U.S. PATENT DOCUMENTS

| | | | |
|---|---|---|---|
| 6,446,200 B1 * | 9/2002 | Ball et al. ....................... 713/1 |
| 6,609,083 B2 * | 8/2003 | Enck et al. .................. 702/186 |
| 6,751,663 B1 | 6/2004 | Farrell et al. | |
| 6,804,691 B2 * | 10/2004 | Coha et al. .................. 707/206 |
| 6,871,265 B1 | 3/2005 | Oren et al. | |
| 6,944,673 B2 * | 9/2005 | Malan et al. ................ 709/237 |
| 7,031,895 B1 * | 4/2006 | Takahashi et al. ............. 703/13 |
| 7,478,156 B1 * | 1/2009 | Pereira ........................ 709/224 |
| 2004/0054680 A1 | 3/2004 | Kelley et al. | |

* cited by examiner

*Primary Examiner*—Derrick W Ferris
*Assistant Examiner*—Mohammad Anwar
(74) *Attorney, Agent, or Firm*—Kenneth R. Corsello; Anne Vachon Dougherty

(57) ABSTRACT

A method for configuring network device adapted to process network traffic comprising a plurality of network flows and to export network flow information. For configuring the network device, a copy of the network traffic that is processed by the network device is created. A simulation of a process of collecting the network flow information using the copy of the network traffic is performed. Based on the results of the simulation, a preferred information collection scheme is determined. The network device is then configured to collect the network flow information to be exported according to the preferred information collection scheme.

11 Claims, 2 Drawing Sheets

METHOD AND DEVICE FOR CONFIGURING A NETWORK DEVICE

TECHNICAL FIELD

The present invention relates to a method and a device for configuring a network device. It further relates to a computer program product enabling a method for configuring a network device. It also relates to a system for processing network traffic and exporting network flow information.

BACKGROUND OF THE INVENTION

An important task when operating a network is to forward and distribute data, as for example performed by routers, NATs (network address translators) and switches. Such and similar devices, referred to as network devices hereinafter, can be separate hardware entities or can be dedicated general purpose computers.

Network devices are often designed to export information on the network traffic they process. Such information can, for example, be used for billing purposes or to monitor traffic for load balancing or to detect malicious traffic, e.g. a denial of service attack. Network traffic usually consists of data packets, several of which make up a data entity, for example a data file. A single transaction might comprise a plurality of data entities to be exchanged between two or more units within the network, for example servers as data sources and clients as destinations. Information on network traffic can be presented on many different levels, for example on the packet level or the transaction level. Information on the packet level can usually be acquired from a Management Information Base (MIB) maintained by the network device. A system for monitoring the performance of a network based on information contained in MIBs is for example disclosed in US 2004/0054680 A1.

A commonly used level for presenting information on network traffic that allows a deeper and more sophisticated analysis of the network traffic is based on network flows. A network flow may be defined as a unidirectional stream of packets from a certain source to a certain destination. A commonly used data format in which network flow information can be exported is defined by Cisco's flow profiling system NetFlow, as for example described in the manual "Cisco IOS Release 12.0 (5) T". An open, general and flexible standard called IPFIX (Internet Protocol Flow Information eXport) is being standardized by an IETF (Internet Engineering Task Force) workgroup.

For a network device to be able to export information on network traffic based on network flows, the network device usually keeps track of flows using a flow state table, sometimes also called flow table or flow cache. Each flow is represented by an entry in the flow state table, where, for example, the number of transmitted packets or transmitted bytes belonging to each flow is recorded. Upon detection of a packet stating a termination of the flow or after a certain period of time has run out, the flow information is exported and subsequently the entry deleted from the flow state table.

Problems can occur under increasing traffic load. As a result of increasing traffic load the flow state table might become so large that updating the flow state table might negatively affect the network devices' performance for processing network traffic. To reduce this effect, an associative memory device can be used to identify network flow information and maintain the flow state table as disclosed by U.S. Pat. No. 6,871,265 B1. Under more traffic, the flow state table might further exceed its maximum capacity so that no further flow information can be gathered. Also, the number of exported netflows can get so high that the additional network traffic negatively affects the network performance.

According, for example, to Cisco's NetFlow system, a solution to this problem is to statistically sample or filter incoming packets to decrease the number of packets considered in the flow state table. Another solution is to use a wider, more general definition of what constitutes a network flow in order to aggregate information. Sampling, filtering and aggregation policies are used to manually configure network devices to utilize one of these or a combination of these techniques. U.S. Pat. No. 6,446,200 B1 and U.S. Pat. No. 6,751,663 B1 disclose a system in which a data collector layer receives network flow information from network devices and sends it to a flow aggregation layer that aggregates received records and stores the aggregated information. That way, aggregation can be performed on packets processed by different network devices, which reduces the amount of finally stored aggregated information even more than aggregation performed in each network device, but does not reduce network traffic due to the transmission of network flow information from the data collector layer to the flow aggregation layer. A drawback of all mentioned techniques is that they might compromise fidelity of the network flow information, in particular if not well tuned to the actual kind of network traffic.

It is therefore a challenge to provide a method, a device and a computer program product for configuring a network flow information exporting device to export network flow information with better fidelity and in a less resource-intensive manner. It is further a challenge to provide a system for processing network traffic and exporting network flow information more effectively.

SUMMARY OF THE INVENTION

According to one aspect of the invention, a method for configuring a network device is provided. The network device is adapted to process network traffic comprising a plurality of network flows, the network device is further adapted to export network flow information. The method comprises the following steps. A copy of the network traffic being processed by the network device is created. A simulation of a process of collecting the network flow information using the copy of the network traffic is performed. Based on the results of the simulation, a preferred information collection scheme is determined. The network device is then configured to collect the network flow information to be exported according to the preferred information collection scheme. The simulation finds the preferred information collection scheme to be used by the network device that provides a higher level of fidelity of the network flow information in a less resource-intensive manner. Configuration of the network device is performed automatically and continuously according to the actual traffic. The method is therefore better suited to be used within an autonomic computing architecture that is self-configuring and self-optimizing. By performing an analysis on the process of collecting the network flow information, off-line burdening of the network device with additional computing tasks is reduced.

In a preferred embodiment of the method, the step of performing the simulation comprises a step of determining parameters of the process of collecting the network flow information for a set of at least two different information collection schemes, followed by a step of determining the preferred information collection scheme to be one of the information collection schemes of the set dependent on the determined parameters. This way, quantities of the process of collecting the network flow information can be taken into account when selecting the preferred information collection scheme. In a further preferred embodiment of the method, the determined parameters comprise a usage of memory while collecting network flow information. This way, the probability of an overflow of the network device's memory resources can be reduced.

In another embodiment of the method, the step of performing the simulation comprises a step of determining parameters of the network flow information to be exported for a set of at least two different information collection schemes, followed by a step of determining the preferred information collection scheme to be one of the information collection schemes of the set dependent on the determined parameters. This way, quantities of the process of exporting network flow information can be taken into account when selecting the preferred information collection scheme. In a further preferred embodiment of the method, the determined parameters comprise an amount of network traffic arising from an export of the network flow information. This way, a creation of additional network traffic due to the network flow information that imposes on the network's performance can be reduced.

In a further preferred embodiment of the method, the step of performing the simulation comprises a determination of a simulated flow state table, resembling a flow state table of the network device. Collecting network flow information by means of a flow state table is commonly used by network devices. Using a similar data structure in the simulation ensures that results of the simulation are better representative of the operation of the network device.

In further preferred embodiments of the method, the information collection schemes comprise an aggregation policy, the aggregation policy comprising instructions for aggregating information on the network traffic to determine the network flow information, and/or a sampling policy, the sampling policy comprising instructions for sampling information prior to a determination of the network flow information and/or a filtering policy, the filtering policy comprising instructions for filtering the network traffic prior to the determination of the network flow information. These ways, aggregation, sampling and/or filtering, which are preferable methods to reduce the amount of data when exporting network flow information, can be advantageously used and eventually also be combined by the method.

According to a second aspect of the invention, a configuration device for configuring a network device is provided. The network device is adapted to process network traffic comprising a plurality of network flows and is further adapted to export network flow information. The configuration device is adapted to receive a copy of the network traffic being processed by the network device and to perform a simulation of a process of collecting the network flow information using the copy of the network traffic. It is further adapted to determine a preferred information collection scheme based on the simulation and to configure the network device to collect the network flow information to be exported according to the preferred information collection scheme.

According to a third aspect of the invention, a system for processing network traffic and exporting network flow information is provided. The system comprises a network device that is adapted to process network traffic comprising a plurality of network flows and to export network flow information. The system further comprises a configuration device as described above and a traffic mirror that is adapted to create a copy of the network traffic being processed by the network device and send the copy to the configuration device.

According to a fourth aspect of the invention, a computer program product comprising a computer-readable medium embodying program instructions executable by a processor to perform a method as described above is provided.

The advantages of the second, third and fourth aspect of the invention correspond to the advantages of the first aspect of the invention.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

DETAILED DESCRIPTION OF PREFERRED EMBODIMENTS

Figure 1:
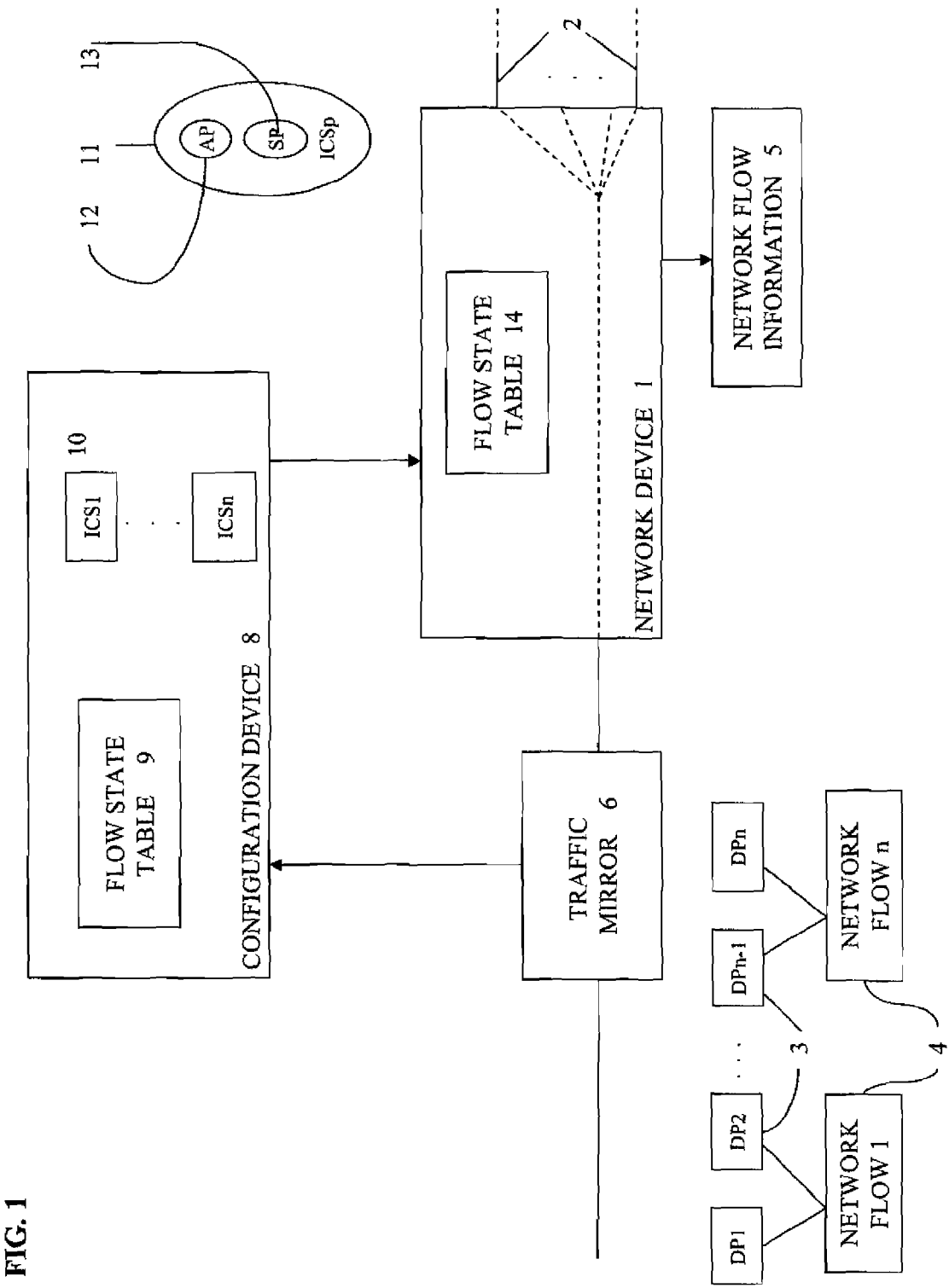
FIG. 1, a schematic diagram of a system for processing network traffic and exporting network flow information, and FIG. 2, a flowchart of a method for configuring a network device.

FIG. 1 shows an embodiment of a system for processing network traffic and for exporting network flow information. It comprises a network device 1 with a plurality of network connections to process network traffic 2. Data being transmitted by the network, making up the network traffic 2, is packed to form data packets 3, DP1-DPn, several of which can make up a network flow 4, NF1-NFn. The network device 1 is adapted to export information on the network flows 4 being processed by the network device 1 as network flow information 5. A traffic mirror 6 is present to create a copy 7 of the network traffic 2. The traffic mirror 6 is connected to a configuration device 8 that receives the copy 7 of the network traffic 2. The configuration device 8 comprises a simulated flow state table 9 and a set 10 of information collection schemes, IC1-ICn. The configuration device 8 is connected to the network device 1 and is adapted to send a preferred information collection scheme ICSp 11 that may comprise an aggregation policy AP 12 and/or a sampling policy SP 13. The network device 1 contains a flow state table 14 from which the network flow information 5 is being extracted. The flow state table 14 is managed by the network device 1 according to the preferred information collection scheme 11.

By way of example, the network device 1 shown in the system of FIG. 1 is a router, used to distribute the network traffic 2 between an incoming network connection (on the left hand side of FIG. 1) and several outgoing network connections (right hand side of FIG. 1).

The transmission of the network traffic 2 in the form of the data packets 3 is a method used by a plurality of internet protocols. Each data packet 3 is equipped with a header carrying information used for correct delivery of the data packet 3, such information comprising e.g. destination IP (internet protocol) address, source IP address, port numbers, protocol type and also additional information, for example on the type of service.

The data packets 3 can be grouped to form the network flows 4 according to the information stored in the header of the data packets 3. In one possible definition, network flows 4 are unidirectional streams of data packets 3 having the same source and destination IP addresses, using the same protocol and referring to the same type of service. This is only one possible definition of the network flows 4. In fact, the technique of aggregation which will be described in more detail herein, is based on the usage of different definitions on what constitutes network flows 4.

When processed by the network device 1, the header of the data packet 3 is being analyzed. The flow state table 14 managed by the network device 1 has entries for the network flows 4 being currently processed, which will be referred to as "open entries" hereinafter. In each open entry of the flow state table 14, information on the respective network flow 4 is stored, for example the number of data packets 3 belonging to the network flow 4 and processed so far or the number of bytes contained in these data packets 3.

If the data packet 3 currently being processed by the network device 1 belongs to one of the network flows 4 with an open entry in the flow state table 14, it is taken into account in this entry. If, on the one hand, a data packet 3 is being processed which states the termination of a network flow 4, the open entry of network flow 4 is closed and the stored information is exported as network flow information 5. In addition, entries might be closed after a predetermined time interval has run out, thereby avoiding keeping entries open indefinitely when no terminating data packet 3 had been or will be received. If, on the other hand, a data packet 3 is being processed which cannot be assigned to any open entry in the flow state table 14, a new entry is created.

Network flow information 5 can be exported using the IPFIX or NetFlow format. Network flow information 5 can be exported using the same network connection as is used for the network traffic 2, even if a separate connection is shown in FIG. 1 for exporting the network flow information 5.

Increasing traffic can lead to an increasing number of open entries, bearing the danger of exceeding the maximum storage capacity available for the flow state table 14. Also, the amount of computing power used for bookkeeping of the larger flow state table 14 will increase with the number of its open entries. The network device 1 is therefore adapted to receive the preferred information collection scheme 11 through which the collection of information on the network flows 4 can be modified. In the embodiment shown in FIG. 1, the techniques of aggregation and/or statistical sampling can be used, defined by the aggregation policy 12 and the sampling policy 13. In other embodiments, filtering can additionally be implemented as a third technique. Aggregation policies 12, sampling policy 13 and/or filtering policies can be transmitted to the network device 1 using a standard control plane method like SNMP (Simple Network Management Protocol), ForCES (Forwarding and Control Element Separation) or COPS-PR (Common Open Policy Service Usage for Policy Provisioning) in combination with PIBs (Policy Information Bases).

When sampling, not every data packet 3 processed by the network device 1 is taken into account in the flow state table 14. For example, through the sampling policy 13 the network device 1 could be configured to only take every second data packet 3 into account. Sampling is statistical in the sense that it does not depend on the header or the content or any other property of the data packet 3, but merely on the order of the arrival.

The technique of filtering is similar to sampling in that not every data packet 3 is taken into account in the flow state table 14. In contrast to sampling, it depends on the data packet 3 itself, whether or not it is taken into account. For example, a filtering policy could state that data packets 3 coming from a certain IP source address or a group or a range of IP source addresses are disregarded for the collection of information on the network flows 4.

In contrast to sampling and filtering, all data packets 3 are taken into account in the flow state table 14 if the technique of aggregation is used. In aggregation, the definition of what constitutes a network flow 4 is modified, thereby possibly reducing the number of entries of the flow state table 14. For example, through the aggregation policy 12 the network device 1 could be configured to subsume under one network flow 4 all data packets 3 directed to the same IP destination address and concerning the same type of service, but coming from a range of IP source addresses rather than from a single IP source address. Another example would be to subsume under one network flow 4 all data packet 3 coming from the same IP source address, directed to the same IP destination address independent of the type of service.

Figure 2:
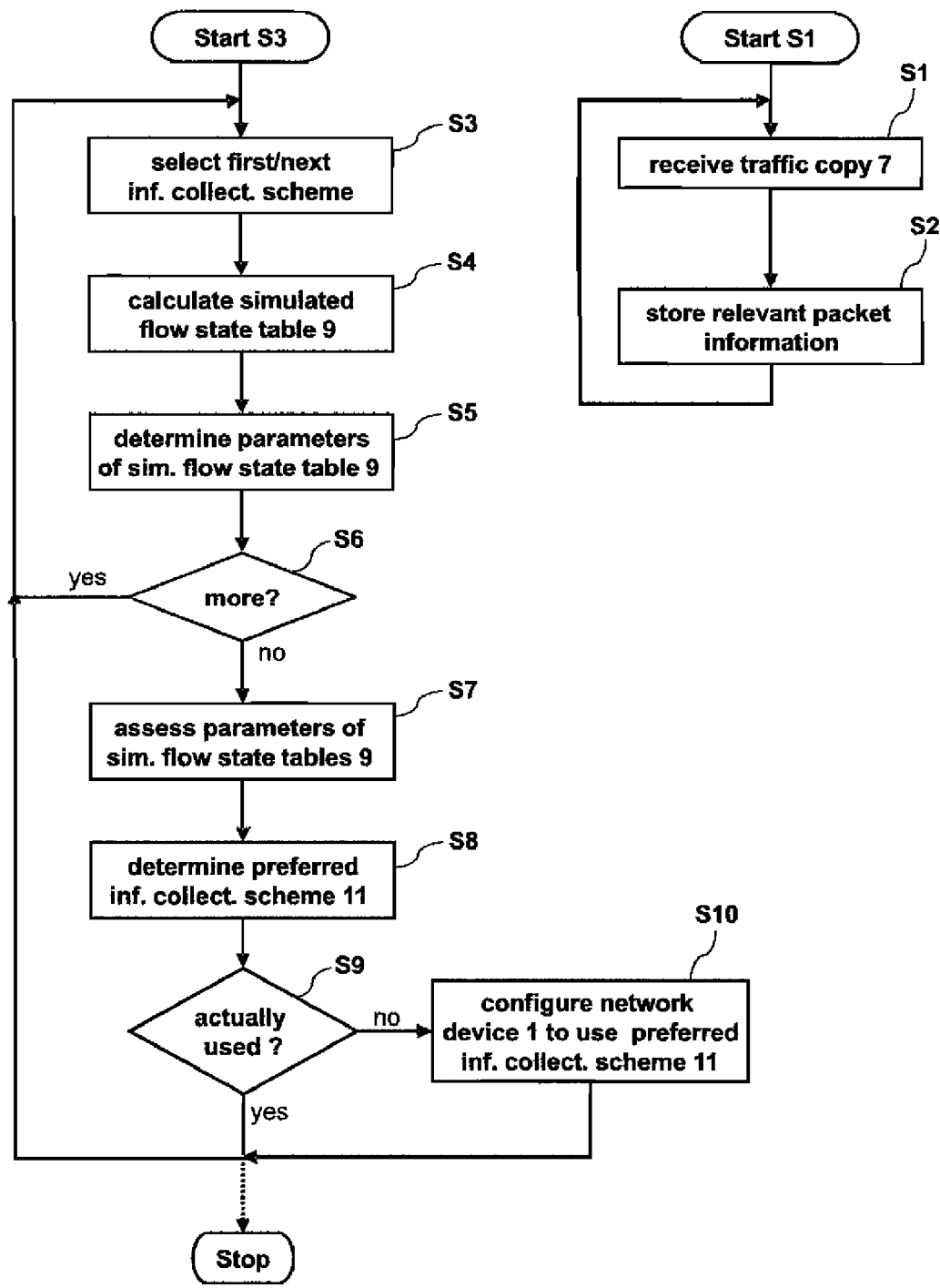

Selecting the preferred information collection scheme 11 that is neither too aggressive concerning information reduction, in which case the fidelity of the network information 5 is compromised, nor too weak, in which case information reduction is less efficient, is performed by the configuration device 7. From the set 10 of information collection schemes it selects the preferred information collection scheme 11 and configures the network device 1 to use the preferred information collection scheme 11. The configuration device 8 uses the copy 7 of the network traffic 2 which is generated by the traffic mirror 6. Depending on the type of network, the traffic mirror 6 can, for example, be a splitter or a fiber tab or any other device suitable to duplicate the network traffic 2. A program being stored in the configuration device 8 and being executed in the configuration device 8 is described now in conjunction with the flow chart of FIG. 2.

In a first group of steps, in a step S1 the copy 7 of network traffic 2 is received by the configuration device 8. As the network traffic 2 does, the copy 7 comprises data in the form of data packets 3. The data packets 3 are analyzed and relevant packet information is stored in a step S2. Relevant information may comprise the source IP address, the destination IP address, the type of service and the length of the data packet 3, e.g. in bytes; in principle the same information that can also be used to determine network flow information 5. The steps S1 and S2 are repeated continuously in order to keep the stored relevant packet information up-to-date, preferably without missing any data packets 3.

A second group of steps, starting with a step S3, is performed in parallel to the first group of steps. In step S3, a first information collection scheme, out of the set 10 of information collection schemes is selected. The selection might be random or might depend on formerly selected information collection scheme or might be based on other criteria. Also, the information collection scheme that is currently used by the network device 1 might be selected to be the first information collection scheme.

In a step S4, a simulated flow state table 9 is determined based on the stored relevant packet information according to the first information collection scheme. The simulated flow state table 9 then resembles the flow state table 14 of the network device 1 as it would be under the same conditions, i.e. the network traffic 2 as stored by the relevant packet information and the aggregation policies 12 and/or the sampling policies 13 of the first information collection scheme. The simulated flow state table 9 is not necessarily an exact copy of how the flow state table 14 of the network device 1 would look, since both might have a different data structure. They however both behave similarly, e.g. growing or shrinking in size, when changing from one information collection scheme to another. In step S4, it might also be simulated how many entries of the simulated flow state table 9 would have been closed in the course of the simulation and would accordingly have been exported as network flow information 5.

In a step S5, results of the simulation are determined and stored. Results can, for example, be the amount of memory used to store the simulated flow state table 9, the amount of exported flow information 5, or the computational power used for book-keeping of the simulated flow state table 9.

The method may then branch in a step S6 to proceed again with step S3, selecting a next information collection scheme out of the set 10 of information collection schemes. The steps S4 and S5 are then repeated using the same stored relevant packet information as in the simulation using the first information collection scheme. Additional stored relevant packet information, which might have been collected in the steps 1 and 2 performed in the meantime, is ignored for the simulations to be comparable. In an alternative embodiment, the simulation results are made independent of the stored relevant packet information by relating the results to the number of data packets 3 they are based on. Then even results of simulations performed with different stored relevant packet information can be compared with each other.

If at least two simulations have been performed, the method may continue with a step S7, in which the results of the simulations performed are evaluated in order to rate the first and next information collection schemes. Evaluation is based on a predetermined set of criteria. Evaluation might comprise a weighting of the memory and computing power usage for book-keeping of the flow state table 9 and the network traffic 2 due to the export of network flow information 5 on the one hand, and information fidelity on the other hand. The evaluation criteria might depend on the purpose the network flow information 5 is intended to be used for. For example, for billing other criteria might be used than for load-balancing.

As a result of the evaluation, one of the first or next information collection schemes might be determined to be the preferred information collection scheme 11 to be used by the network device 1. If not already actually used (as determined at step S9), the network device 1 is configured at step S10 to use the preferred information collection scheme 11 from then on.

The method may then terminate, but usually it will branch backwards and proceed again with step S3. This way, it is continuously evaluated whether one of the information collection schemes of the set 10 might lead to a better compromise between fidelity and usage of resources than the one actually used by the network device 1. In another embodiment, the configuration device 8 continuously calculates the simulated flow state table 9 for the information collection scheme currently used by the network device 1. Only if the result of this simulation reveals that the simulated flow state table 9 becomes too large or the amount of exported flow state information 5 becomes too high, will alternative information collection schemes be searched for.

The selection of the first and the next information collection schemes (step S3) can be based on criteria that resemble experience or results of former simulations ("educated guess"). The information collection schemes of the set 10 can, for example, be ordered according to their data reduction capability. Depending on the result of the simulation for the first, e.g. actual, information collection scheme, the next information collection scheme can be selected considering the expected data reduction capability.

In another embodiment of the method, the network device can be adapted to export information on the state, e.g. size, of the flow state table 14 to the configuration device 8. The configuration device 8 can be adapted to use this state information for selecting the preferred information collection scheme 11 in addition to the results of the simulations. Transmission of state information could be performed using SNMP.

The method for configuring a network device may be implemented in part or as a whole in software or hardware or a combination thereof. The method may, when implemented in hardware, be performed by a configuration device for configuring a network device. The method may, when implemented in software, be performed by a computer program product. The computer program product may be provided on a non-transitory computer readable medium embodying software instructions executable by a computer to perform the steps of the method. The computer-readable medium may, for example, be a CD-ROM, a DVD, a flash memory card, a hard disk, or any other suitable computer-readable medium, e.g., a storage medium within a network.

The invention claimed is:

1. A computer-implemented method for configuring a network device, the network device being adapted to process network traffic comprising a plurality of network flows, the network device being further adapted to export network flow information, the method comprising the steps of:
    creating a copy of actual network traffic being processed by the network device;
    performing at least one simulation of a process of collecting network flow information using the copy of the actual network traffic, where the step of performing the simulation comprises the determination of a simulated flow state table, wherein said simulated flow state table is modeled on a flow state table of the network device;
    determining a preferred information collection scheme based on results of the at least one simulation; and
    configuring the network device to collect the network flow information to be exported according to the preferred information collection scheme.

2. The method according to claim 1, where the step of performing the simulation comprises the steps of:
    determining parameters for collecting the network flow information for a set of at least two different information collection schemes;
    determining the preferred information collection scheme to be one of the information collection schemes of the set dependent on the determined parameters.

3. The method according to claim 2, where the determined parameters comprise a usage of memory while collecting the network flow information.

4. The method according to claim 2, where the information collection schemes comprise an aggregation policy comprising instructions for aggregating information on the network traffic to determine the network flow information.

5. The method according to claim 2, where the information collection schemes comprise a sampling policy comprising instructions for sampling the network traffic prior to a determination of the network flow information.

6. The method according to claim 2, where the information collection schemes comprise a filtering policy, the filtering policy comprising instructions for filtering the network traffic prior to a determination of the network flow information.

7. The method according to claim 1, where the step of performing the simulation comprises the steps of:
    determining parameters of the network flow information to be exported for a set of at least two different information collection schemes;
    determining the preferred information collection scheme to be one of the information collection schemes of the set dependent on the determined parameters.

8. The method according to claim 7, where the determined parameters comprise an amount of network traffic arising from an export of the network flow information.

9. A configuration device for configuring a network device, the network device being adapted to process network traffic comprising a plurality of network flows, the network device being further adapted to export network flow information, the configuration device comprising:
- means for obtaining a copy of actual network traffic being processed by the network device;
- a simulation component for performing at least one simulation of a process of collecting network flow information using the copy of the actual network traffic, where the step of performing the simulation comprises the determination of a simulated flow state table, wherein said simulated flow state table is modeled on a flow state table of the network device;
- a selection component for determining a preferred information collection scheme based on the at least one simulation; and
- a configuration component for configuring the network device to collect the network flow information to be exported according to the preferred information collection scheme.

10. A system for processing network traffic and exporting network flow information comprising
- a network device being adapted to process network traffic comprising a plurality of network flows, the network device being further adapted to export network flow information;
- a configuration device for configuring the network device, the configuration device comprising:
- means for obtaining a copy of actual network traffic being processed by the network device;
- a simulation component for performing at least one simulation of a process of collecting network flow information using the copy of the actual network traffic, where the step of performing the simulation comprises the determination of a simulated flow state table, wherein said simulated flow state table is modeled on a flow state table of the network device;
- a selection component for determining a preferred information collection scheme based on the at least one simulation;
- a configuration component for configuring the network device to collect the network flow information to be exported according to the preferred information collection scheme; and
- a traffic mirror adapted to create a copy of the network traffic being processed by the network device and send the copy to the configuration device.

11. A non-transitory computer readable medium readable by machine storing a program of instructions executable by the machine for performing a method for configuring a network device, the network device being adapted to process network traffic comprising a plurality of network flows, the network device being further adapted to export network flow information, the method comprising the steps of:
- creating a copy of actual network traffic being processed by the network device;
- performing at least one simulation of a process of collecting network flow information using the copy of the actual network traffic, where the step of performing the simulation comprises the determination of a simulated flow state table, wherein said simulated flow state table is modeled on a flow state table of the network device;
- determining a preferred information collection scheme based on results of the at least one simulation; and
- configuring the network device to collect the network flow information to be exported according to the preferred information collection scheme.

* * * * *